(12) United States Patent
Puryk et al.

(10) Patent No.: US 7,001,268 B2
(45) Date of Patent: Feb. 21, 2006

(54) LATCH MECHANISM FOR A GRATE IN AN AGRICULTURAL COMBINE

(75) Inventors: Corwin Marcus Raymond Puryk, East Moline, IL (US); Daniel Marc Heim, Moline, IL (US)

(73) Assignee: Deere & Company, Moline, IL (US)

( * ) Notice: Subject to any disclaimer, the term of this patent is extended or adjusted under 35 U.S.C. 154(b) by 362 days.

(21) Appl. No.: 10/621,665

(22) Filed: Jul. 17, 2003

(65) Prior Publication Data

US 2005/0215299 A1    Sep. 29, 2005

(51) Int. Cl.
*A01F 12/28* (2006.01)

(52) U.S. Cl. ......... 460/109; 460/59

(58) Field of Classification Search ........ 460/107–109, 460/59, 72, 79

See application file for complete search history.

(56) References Cited

U.S. PATENT DOCUMENTS

| | | | | |
|---|---|---|---|---|
| 3,470,881 A | * | 10/1969 | Pauw et al. | 460/109 |
| 3,568,682 A | | 3/1971 | Knapp et al. | 130/27 |
| 4,711,252 A | | 12/1987 | Bernhardt et al. | 130/27 |
| 4,993,991 A | | 2/1991 | Yarmashev et al. | 460/66 |
| 5,489,239 A | * | 2/1996 | Matousek et al. | 460/62 |
| 5,613,907 A | | 3/1997 | Harden | 460/109 |
| 5,919,087 A | | 7/1999 | Strong et al. | 460/72 |
| 5,993,313 A | | 11/1999 | Healy et al. | 460/119 |
| 6,193,604 B1 | | 2/2001 | Ramp et al. | 460/110 |
| 6,443,835 B1 | | 9/2002 | Imel et al. | 460/107 |
| 6,503,142 B1 | | 1/2003 | Imel et al. | 460/107 |

* cited by examiner

*Primary Examiner*—Meredith Petravick

(57) ABSTRACT

In an agricultural combine, a latch mechanism for attaching a grate to the crop processing unit. The latch mechanism comprises a support bar on the crop processing unit, a support receptacle on the grate, a latch handle, and a latch retainer. The support receptacle envelopes the support bar the when the grate is attached to the crop processing unit, with the latch handle and latch retainer cooperating to hold the support receptacle against the support bar.

23 Claims, 5 Drawing Sheets

LATCH MECHANISM FOR A GRATE IN AN AGRICULTURAL COMBINE

FIELD OF THE INVENTION

The present invention is related to a grate for an agricultural combine and in particular to an easily removable latch mechanism for attaching the grate to a crop processing unit.

BACKGROUND OF THE INVENTION

Agricultural harvesters, or combines, are large machines that harvest, thresh, separate and clean an agricultural crop. The resulting clean grain is stored in a grain tank located on the combine. The clean grain can then be transported from the grain tank to a truck, grain cart or other receiving bin by an unloading auger. There are three basic types of combines: (1) a conventional combine having a transverse threshing cylinder for threshing the harvested crop, and straw walkers for separating the threshed crop; (2) a hybrid combine having a transverse threshing cylinder for threshing the harvested crop, and one or more separator rotors within a housing for separating the threshed crop; and (3) a rotary combine having a rotor within a housing for threshing and separating the harvested crop.

In conventional and hybrid combines, the crop processing unit comprises a transverse threshing cylinder mounted in close proximity to a grate called a concave. The rotating threshing cylinder in conjunction with the fixed concave threshes the crop material. The concave generally comprises a series of transversely extending bars through which are inserted axially running wires. A concave of this type forms a grate through which the majority of the threshed grain and chaff fall onto a collecting assembly where it is directed to the cleaning system of the combine. U.S. Pat. Nos. 4,909,772 and 5,024,631 each disclose a conventional transverse concave for a conventional combine. In hybrid combines with rotary separation, the crop processing unit additionally comprises one or more rotors surrounded by a housing. The bottom of the housing is provided with a series of separating grates through which the grain and chaff fall from the housing.

Rotary combines are provided with an infeed section for pulling crop material into the rotary crop processing unit from the feederhouse, a threshing section for threshing the crop material, and a separating section for separating the grain from the threshed crop material. The rotary crop processing unit comprises a rotor that is surrounded by a housing. The bottom of the housing is provided with a series of grates through which the grain and chaff fall from the housing. The grates located beneath the threshing section of the rotary crop processing unit comprises a concave, such a concave is disclosed in U.S. Pat. No. 4,499,908. In this patent one side of the concave is pivotally mounted to the crop processing unit and the other side is adjustably mounted to the crop processing unit to control the clearance between the concave and rotor. U.S. Pat. Nos. 5,613,907 and 6,193,604 each disclose a concave for a rotary combine.

Crop material, especially green crop material and high volume crop material, tends to plug the concave, not allowing grain to pass through the concave and thus reducing capacity and threshing ability. Often, removal of the concave is required in order to clear the plugged material. Furthermore, in some rotary combines, it is necessary to change between two different concaves, with different sized openings, when changing between harvesting of small and large grain crops. Thus, it is desirable that mounting means for the concave provide for ease of attachment and removal.

SUMMARY OF THE INVENTION

The present invention provides a removable latch mechanism for the pivotal mounting of a grate to a crop processing unit of an agricultural harvester. The latch mechanism comprises a support bar on the crop processing unit, and a support receptacle on the grate. A latch handle secures the support bar and support receptacle to each other, while a latch retainer secures the latch handle in place. The support bar is a cylindrical member that extends along the crop processing unit parallel to the rotating crop processing member, such as a rotor. The support receptacle extends along the right side of the grate, and includes an upper lip and a lower lip. A pry hole is located in the upper lip, while a retaining slot is located in the lower lip. The latch handle is a bar-like member having a handle end, a handle body, and a pry nose. The latch retainer is a crescent shaped member having a retainer body, and a handle slot.

To attach the grate to the crop processing unit, the grate is placed in a desired location along the unit, then lifted such that the support receptacle envelops the support bar. With the support receptacle in place, the pry nose of the latch handle is inserted up into the pry hole. With the pry nose in place, the handle body is then passed through the retainer slot on the lower lip, and forced against the support bar to pry the support receptacle further against the support bar. Once the latch handle has substantially seated the support receptacle against the support bar, the latch retainer is placed against the latch handle such that the handle slot envelops the handle end, and the retainer body aligns with the retainer slot on the lower lip. The latch retainer is then forced into the retainer slot, thus securing the latch handle in place. To remove the grate from the crop processing unit, the steps for securing the latch mechanism are executed in reverse order.

DETAILED DESCRIPTION

Figure 1:
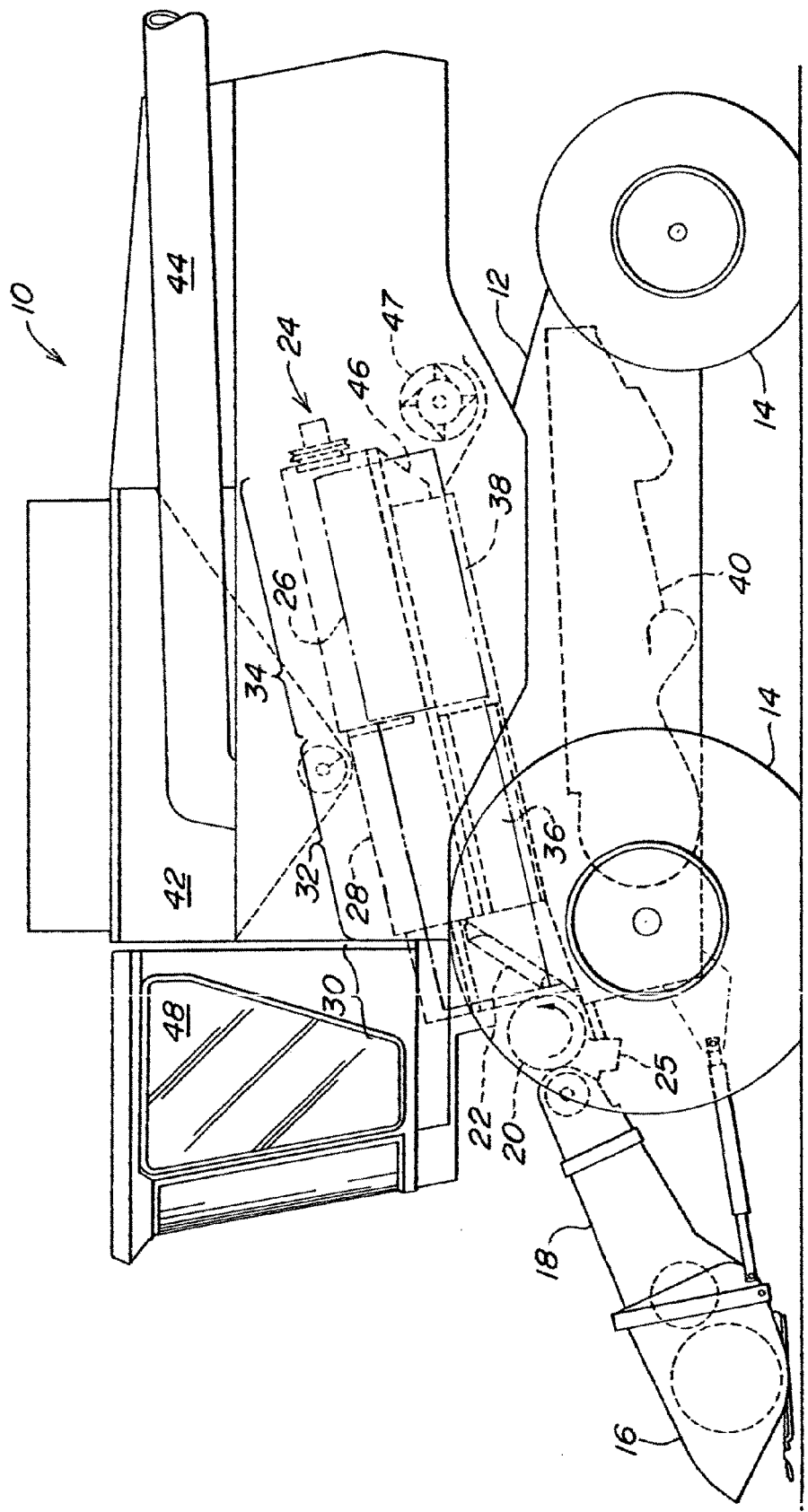
FIG. 1 is a semi-schematic side elevation of a self propelled agricultural harvester having a rotary crop processing assembly.

FIG. 1 shows an agricultural harvester 10, or combine, comprising a supporting structure 12 having ground engaging wheels 14. A harvesting platform 16 is used for harvesting a crop and directing it to a feederhouse 18. The harvested crop is directed by the feederhouse 18 to a beater 20. The beater directs the crop upwardly through the inlet transition section 22 to a rotary crop processing unit 24. A rock trap 25 is positioned between the feederhouse and the beater 20.

Figure 2:
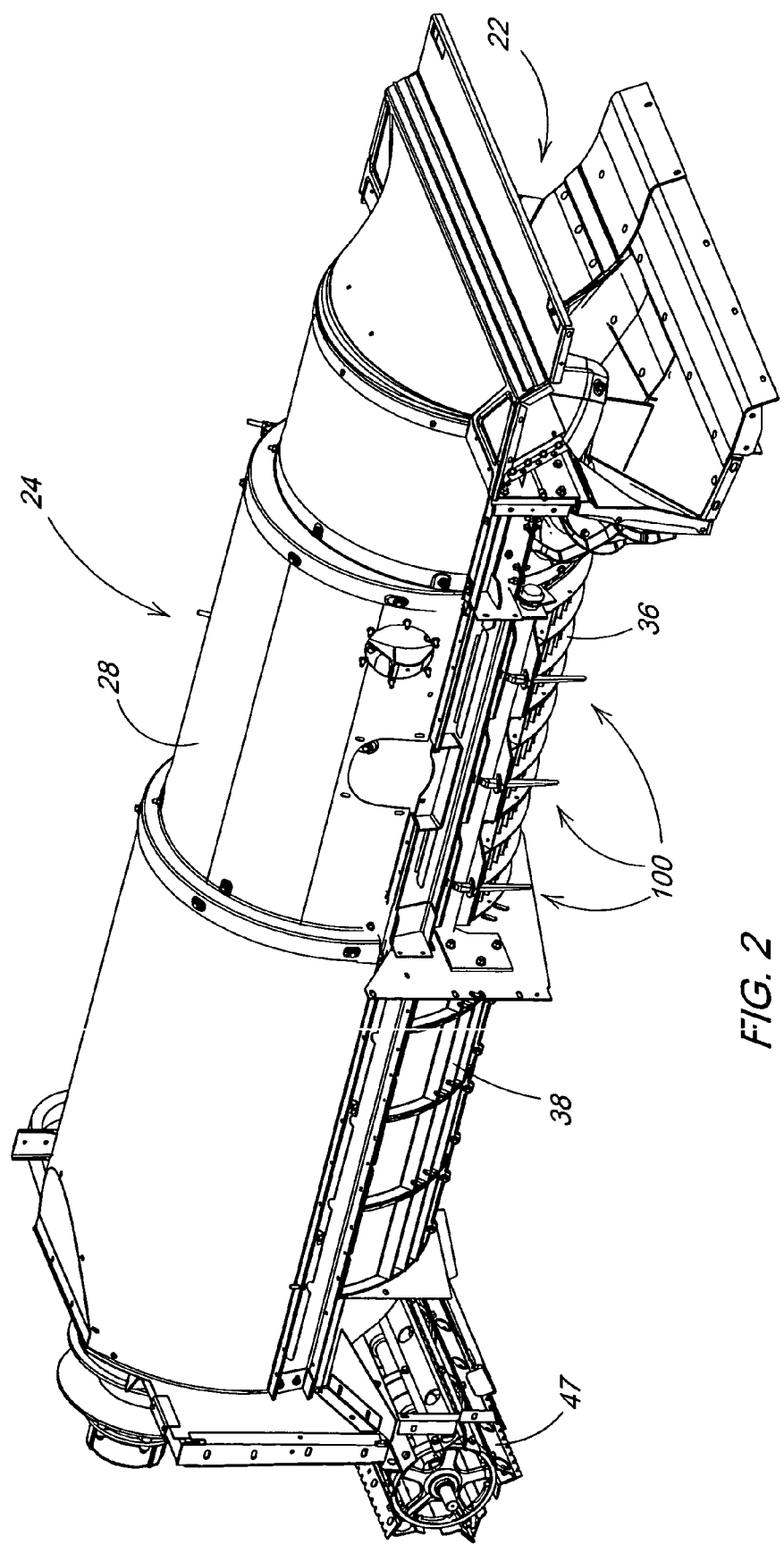
FIG. 2 is a perspective view of the latch mechanism of the present invention shown in a rotary crop processing assembly of a self propelled combine.
Figure 3:
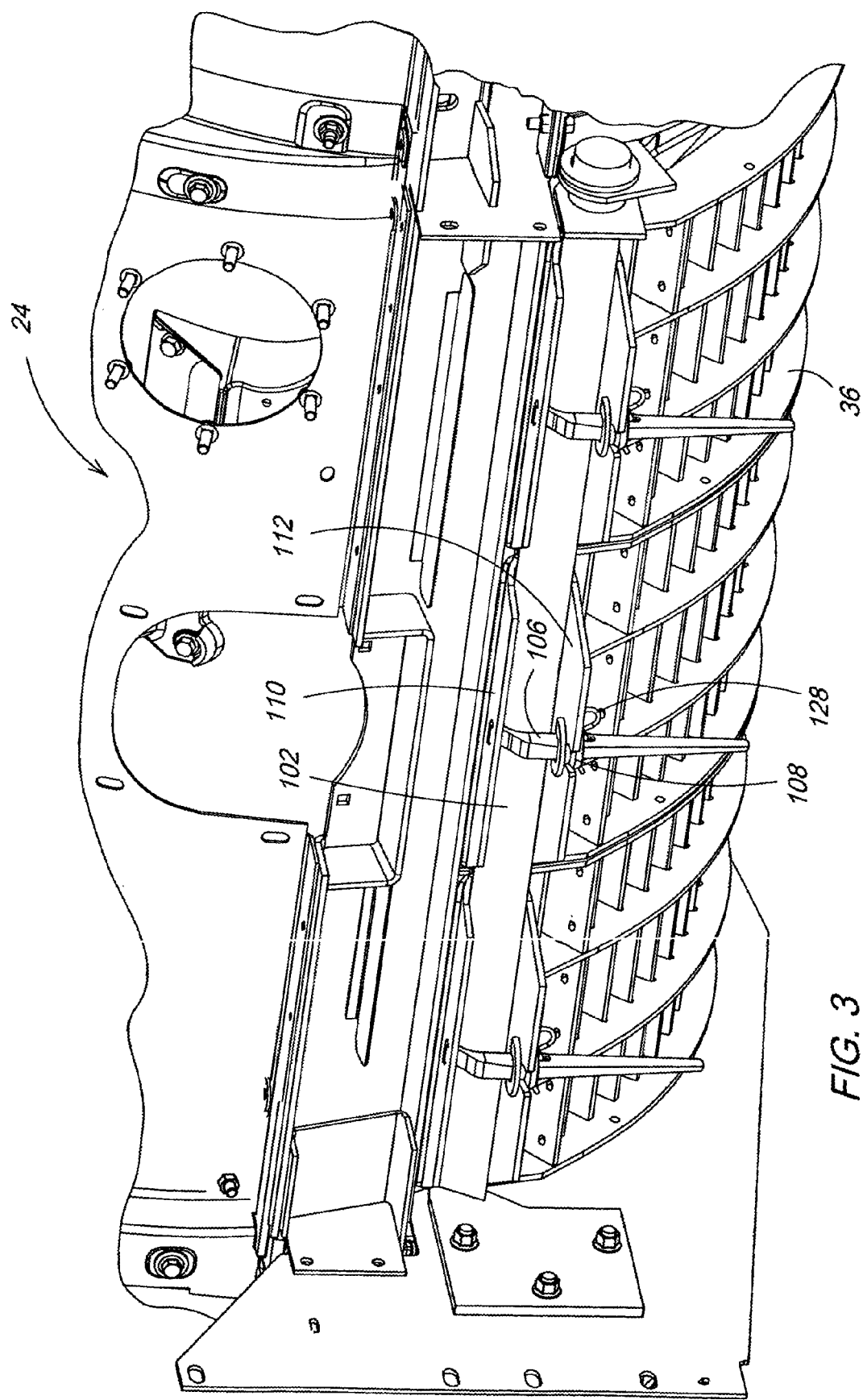
FIG. 3 is a detail perspective view of the latch mechanism of the present invention.
Figure 4:
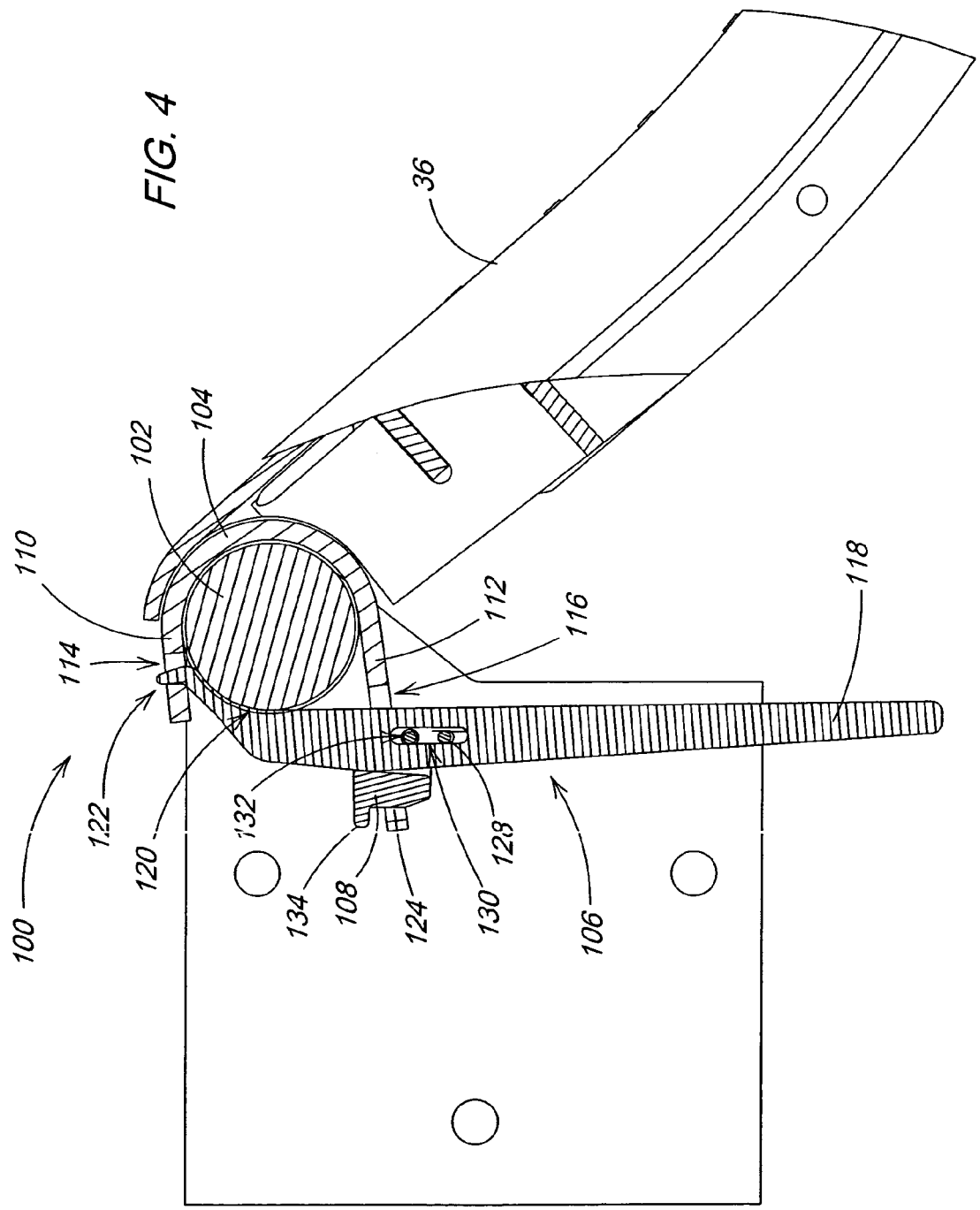
FIG. 4 is a section view of the latch mechanism of the present invention viewed from the front of the self propelled combine.
Figure 5:
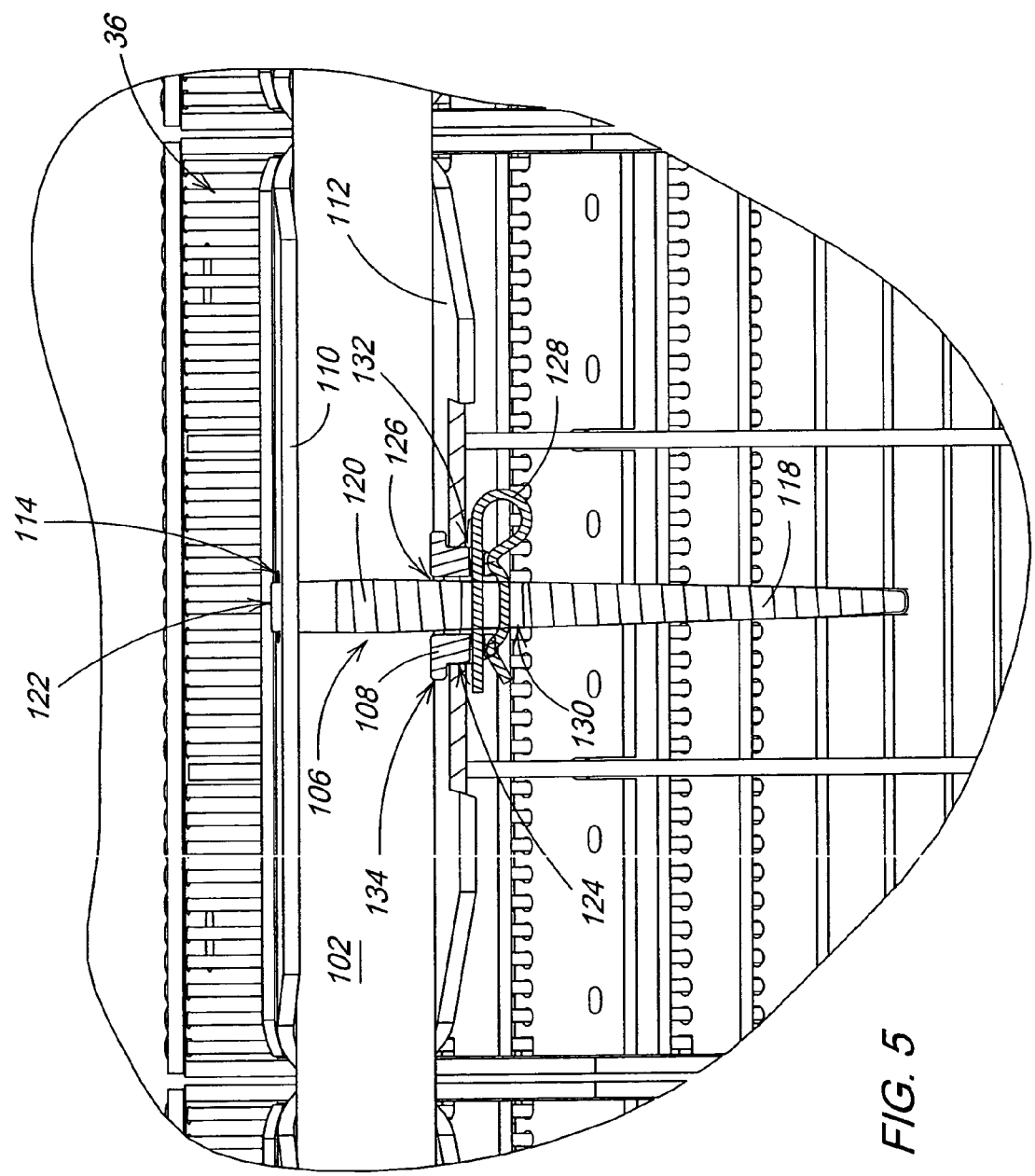
FIG. 5 is a section view of the latch mechanism of the present invention viewed from the right side of the self propelled combine.

FIG. 2 shows the rotary crop processing unit 24, which threshes and separates the harvested crop material. The rotary crop processing unit 24 comprises rotating crop processing member, or rotor 26, circumferentially surrounded by a housing 28 that together define an inlet section 30, a threshing section 32 and a separating section 34. The rotor 26 comprises a hollow cylindrical drum having a plurality of crop processing elements that engage the crop and rotate it in the housing 28. The bottom of the housing has a grate, known as a concave 36, under the threshing section 32, and a separating grate 38 under the separating section 34.

Grain and chaff falling through the concave 36 and the separating grate 38 are directed to cleaning system 40. The cleaning system 40 removes the chaff and directs the clean grain to a clean grain elevator (not shown). The clean grain elevator deposits the clean grain in a grain tank 42. The clean grain in the tank 42 can be unloaded into a grain cart or truck by an unloading auger 44. Threshed and separated straw is discharged from the rotary crop processing unit 24 through outlet 46 to a discharge beater 47. The discharge beater in turn propels the straw out the rear of the combine. The operation of the combine is controlled from operator's cab 48.

FIGS. 2 through 5 show the present invention, a latch mechanism 100 for attaching a grate to the crop processing unit 24 of an agricultural harvester. The illustrated embodiment shows the latch mechanism 100 attaching the concave 36 located under the threshing section 32 to the rotary crop processing unit 24. The latch mechanism 100 of the present invention may also be used for attaching the separating grate 38 located under the separating section 34 to the rotary crop processing unit 24. In addition, the latch mechanism may also be used for attaching the concaves of a transverse threshing cylinder in a conventional or hybrid combine, or for attaching the separating grates of a rotary separator in a hybrid combine.

The latch mechanism 100 comprises a support bar 102 on the crop processing unit 24, a support receptacle 104 on the concave 36, a latch handle 106 for securing the support bar 102 and support receptacle 104 to each other, and a latch retainer 108 for securing the latch handle 106 in place. The support bar 102 is a cylindrical member that extends along the crop processing unit 24 parallel to the rotor 26. The support receptacle 104 extends along the right side of the concave 36, and includes an upper lip 110 and a lower lip 112. A pry hole 114 is located in the upper lip 110, while a retaining slot 116 is located in the lower lip 112. The latch handle 106 is a bar-like member having a handle end 118, a handle body 120, and a pry nose 122. The latch retainer 108 is a crescent shaped member having a retainer body 124, and a handle slot 126. Both the latch handle 106 and latch retainer 108 in the illustrated embodiment are fashioned from cast steel alloy.

To attach the concave 36 to the crop processing unit 24, the concave 36 is placed in a desired location along the crop processing unit 24, then lifted such that the support receptacle 104 envelops the support bar 102. With the support receptacle 104 in place, the pry nose 122 of the latch handle is inserted up into the pry hole 114. With the pry nose 122 in place, the handle body 120 is moved toward the support bar 102 by the handle end 118, passing through the retainer slot 116 on the lower lip, and is forced against the support bar 102 to pry the support receptacle 104 further against the support bar 102. Once the latch handle 106 has substantially seated the support receptacle 104 against the support bar 102, the latch retainer 108 is placed against the latch handle 106 such that the handle slot 126 envelops the handle end 118, and the retainer body 124 aligns with the retainer slot 116 on the lower lip. The latch retainer 108 is then forced into the retainer slot 116, thus securing the latch handle 106 in place. In the illustrated embodiment, a hammer may be used to force the retainer 108 in place.

In the illustrated embodiment, a retaining pin 128 is also utilized to secure the latch retainer 108 to the latch handle 106. The retaining pin 128 is inserted into both a retainer pin hole 132 on the latch retainer 108, and a latch pin hole 130 on the latch handle 106. Furthermore, the illustrated embodiment includes a seat 134 on the latch retainer 108. The seat 134 is larger than the retainer slot 116 opening so that the retainer 108 is prevented from being forced past the retainer slot 116 during assembly.

Once the concave 36 is secured by the latch mechanism 100, the concave 36 may be rotated up about the support bar 102 towards the rotor 26 for attachment to the crop processing unit 24 at the side of the concave 36 opposite the latch mechanism 100. Attachment methods at this side of the concave 36 vary, but may include direct attachment to the crop processing unit 24 by fasteners, or attachment to an adjustable mechanism on the crop processing unit 24 (not shown) adapted to vary the clearance distance between the concave 36 and the rotor 24. To remove the concave 36 from the crop processing unit 24, the concave 36 is first unsecured from the crop processing unit 24 at the side of the concave 36 opposite the latch mechanism 100. The steps for securing the latch mechanism 100 are then executed in reverse order.

Having described the illustrated embodiment, it will become apparent that various modifications can be made without departing from the scope of the invention as defined in the accompanying claims.

What is claimed is:

1. In an agricultural harvester having a crop processing unit comprising a rotating crop processing member within a housing having a grate, a latch mechanism for attaching the grate to the crop processing unit comprising:

a support bar extending along the crop processing unit for supporting the grate;

a support receptacle extending along the grate for supporting the grate from the support bar, the support receptacle having an upper lip with a pry hole, and a lower lip with a retaining slot, the support bar being enveloped by the support receptacle when the grate is attached to the crop processing unit by the latch mechanism;

a latch handle for securing the support receptacle against the support bar, the latch handle having a handle end, a handle body, and a pry nose, the pry nose being inserted into the pry hole, and handle body seating against the support bar when the grate is attached to the crop processing unit by the latch mechanism;

a latch retainer for securing the latch handle against the support bar, the latch retainer having a retainer body, and a handle slot, the retainer body extending through the retainer slot, and the handle end extending through the handle slot when the grate is attached to the crop processing unit by the latch mechanism.

2. The latch mechanism defined in claim 1 further comprising a latch pin for securing the latch retainer to the latch handle, the latch pin extending through a retainer pin hole on the latch retainer, and the latch pin extending through a handle pin hole on the latch handle when the grate is attached to the crop processing unit by the latch mechanism.

3. The latch mechanism defined in claim 2 wherein the support bar is oriented parallel to the rotating crop processing member.

4. The latch mechanism defined in claim 3 wherein the support bar is cylindrical, and the support receptacle is concave, the latch mechanism being adapted such that the grate is pivotally attached relative to the crop processing unit.

5. The latch mechanism defined in claim 4 wherein the retainer further comprises a retainer seat, the retainer seat being seated against the lower lip of the support receptacle when the grate is attached to the crop processing unit by the latch mechanism.

6. The latch mechanism defined in claim 5 wherein the grate is a concave.

7. The latch mechanism defined in claim 1 wherein the support bar is oriented parallel to the rotating crop processing member.

8. The latch mechanism defined in claim 7 wherein the support bar is cylindrical, and the support receptacle is concave, the latch mechanism being adapted such that the grate is pivotally attached relative to the crop processing unit.

9. The latch mechanism defined in claim 8 wherein the retainer further comprises a retainer seat, the retainer seat being seated against the lower lip of the support receptacle when the grate is attached to the crop processing unit by the latch mechanism.

10. The latch mechanism defined in claim 9 wherein the grate is a concave.

11. The latch mechanism defined in claim 1 wherein the support bar is cylindrical, and the support receptacle is concave, the latch mechanism being adapted such that the grate is pivotally attached relative to the crop processing unit.

12. The latch mechanism defined in claim 11 wherein the retainer further comprises a retainer seat, the retainer seat being seated against the lower lip of the support receptacle when the grate is attached to the crop processing unit by the latch mechanism.

13. The latch mechanism defined in claim 12 wherein the grate is a concave.

14. In an agricultural harvester having a crop processing unit comprising a rotating crop processing member within a housing having a grate, a latch mechanism for attaching the grate to the crop processing unit comprising:
   a cylindrical support bar oriented parallel to the rotating crop processing member and extending along the crop processing unit for supporting the concave;
   a concave shaped support receptacle extending along the grate for supporting the grate from the support bar, the support receptacle having an upper lip with a pry hole, and a lower lip with a retaining slot, the support bar being enveloped by the support receptacle when the grate is attached to the crop processing unit by the latch mechanism;
   a latch handle for securing the support receptacle against the support bar, the latch handle having a handle end, a handle body, and a pry nose, the pry nose being inserted into the pry hole, and handle body seating against the support bar when the grate is attached to the crop processing unit by the latch mechanism;
   a latch retainer for securing the latch handle against the support bar, the latch retainer having a retainer body, and a handle slot, the retainer body extending through the retainer slot, and the handle end extending through the handle slot when the grate is attached to the crop processing unit by the latch mechanism;
   a latch pin for securing the latch retainer to the latch handle, the latch pin extending through a retainer pin hole on the latch retainer, and the latch pin extending through a handle pin hole on the latch handle when the grate is attached to the crop processing unit by the latch mechanism.

15. The latch mechanism defined in claim 14 wherein the retainer further comprises a retainer seat, the retainer seat being seated against the lower lip of the support receptacle when the grate is attached to the crop processing unit by the latch mechanism.

16. The latch mechanism defined in claim 14 wherein the grate is a concave.

17. The latch mechanism defined in claim 16 wherein the grate is a concave.

18. In an agricultural harvester having a crop processing unit comprising a rotating crop processing member within a housing having a grate, and a latch mechanism comprising a support bar extending along the crop processing unit, a support receptacle extending along the grate, a latch handle, and a latch retainer, the support receptacle having an upper lip with a pry hole, and a lower lip with a retaining slot, the latch handle having a handle end, a handle body, and a pry nose, and the latch retainer having a retainer body, and a handle slot, a method for attaching the grate to the crop processing unit with the latch mechanism comprising:
   placing the grate in a desired location along the crop processing unit and lifting the grate such that the support receptacle envelops the support bar;
   inserting the pry nose of the latch handle into the pry hole on the upper lip of the support receptacle from a side of the upper lip adjacent to the support bar;
   moving the handle body of the latch handle toward the support bar by the handle end, through the retainer slot on the lower lip, and against the support bar until the support receptacle is substantially seated against the support bar;
   placing the latch retainer against the latch handle such that the handle slot of the retainer envelops the handle end, and the retainer body aligns with the retainer slot on the lower lip of the support receptacle;
   forcing the latch retainer into the retainer slot.

19. The method for attaching the grate to the crop processing unit with the latch mechanism described in claim 18 wherein the retainer further comprises a retainer seat, the method further comprising forcing the latch retainer into the retainer slot until the retainer seat is against the lower lip of the support receptacle.

20. The method for attaching the grate to the crop processing unit with the latch mechanism described in claim 19 wherein the latch mechanism further comprises a latch pin, a retainer pin hole on the latch retainer, and a handle pin hole on the latch handle, the method further comprising inserting the latch pin into both the retainer pin hole on the latch retainer and the latch pin hole on the latch handle after the latch retainer has been forced into the retainer slot.

21. The method for attaching the grate to the crop processing unit with the latch mechanism described in claim 20 wherein the grate is a concave.

22. The method for attaching the grate to the crop processing unit with the latch mechanism described in claim 18 wherein the latch mechanism further comprises a latch pin, a retainer pin hole on the latch retainer, and a handle pin hole on the latch handle, the method further comprising inserting the latch pin into both the retainer pin hole on the latch retainer and the latch pin hole on the latch handle after the latch retainer has been forced into the retainer slot.

23. The method for attaching the grate to the crop processing unit with the latch mechanism described in claim 22 wherein the grate is a concave.

* * * * *